G. M. SMITH.
Tuyere.
No. 212,994. Patented Mar. 4, 1879.
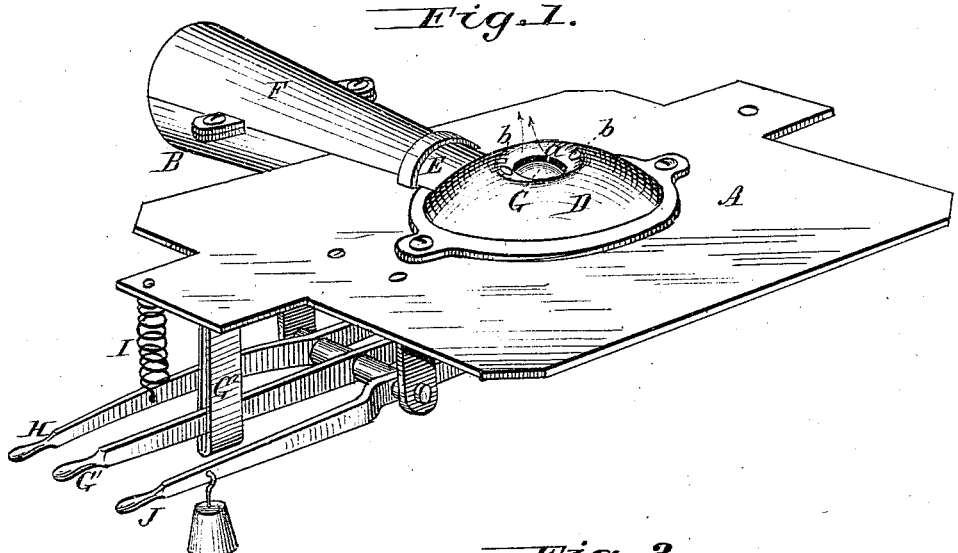
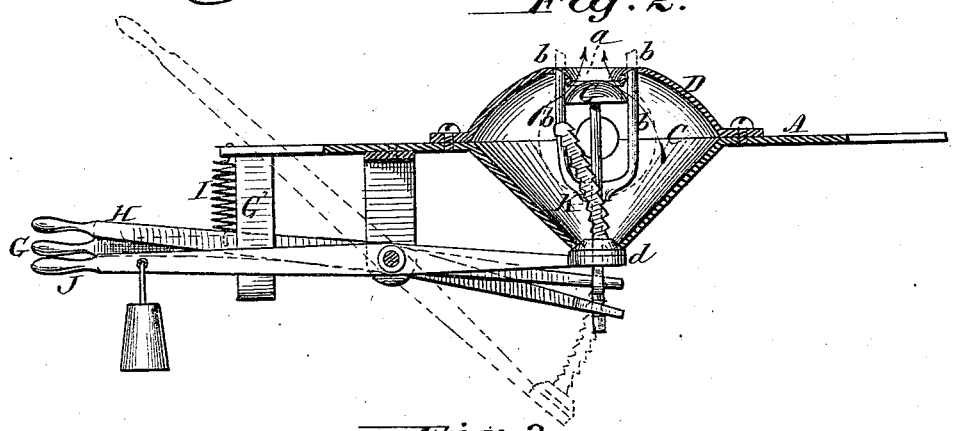
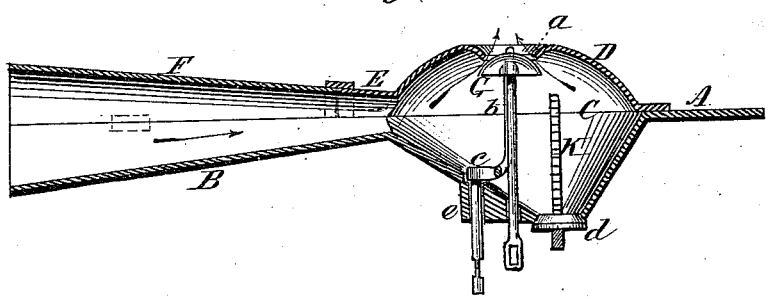
Attest:
H. D. Perrine
Floyd Norris
Inventor.
George M. Smith
By Johnson & Johnson
Atty's.

UNITED STATES PATENT OFFICE.

GEORGE M. SMITH, OF SALEM, OHIO.

IMPROVEMENT IN TUYERES.

Specification forming part of Letters Patent No. 212,994, dated March 4, 1879; application filed December 31, 1878.

*To all whom it may concern:*

Be it known that I, GEORGE M. SMITH, of Salem, in the county of Columbiana and State of Ohio, have invented certain new and useful Improvements in Tuyeres for Blacksmiths' Forges, of which the following is a specification:

I have improved the blacksmith's tuyere in which a conical blast-regulating valve and an ash and cinder discharging valve are used and operated by separate levers. I have combined with the tuyere-crown a poker, consisting of two or more breakers, which pierce the crown and are adapted to be operated independent of a central conical blast-regulating valve, for breaking and loosening the cinders upon the fire-bed, and prevent them from becoming hard and choking the blast-orifice. A lever is arranged to operate the poke-rods and to maintain them in positions flush with the crown-surface by a spring, which constantly tends to draw the poke-rods down. A weighted valved lever closes the cinder-discharging opening of the blast-chamber from below, and with this valved lever I have combined a rake arm or rack, extending from its valved end into said chamber, so as to be operated with a saw-like action to cut up and rake out the cinders and ashes which may pass the tuyere-valve, and thus, in connection with the blast from the bellows, keep the blast-chamber clear of accumulating ashes and cinders. This rake device and its valved lever are independent of the blast-valve and its adjusting-lever, and when operated the blast-valve is closed.

The regulating blast-valve is carried by a lever arranged between and independent of the levers of the rake and of the poke-arms, and is combined with a pinch or gripe spring, by which it is held in its adjustment to regulate its valve to give more or less blast at the tuyere-orifice to the fire of the forge. The levers thus arranged are fulcrumed below the bed-plate upon the same axis-stem.

The blast-pipe is made of longitudinal sections, the lower one of which is integral with the bed-plate, and the upper section is joined therewith and with a semi-cylindrical extension from the crown-plate, which is a separate casting screwed to the bed-plate, so as to be renewed when necessary. The blast-chamber is of the form of a basin, and the crown-plate is convex, and has a curved depression at its orifice, within which the convex valve partially extends to regulate the blast to the fire.

Referring to the drawings, Figure 1 represents a view, in perspective, of my improved tuyere, the poke-arms being shown independent of the blast-valve; Fig. 2, a vertical section taken through the valves and levers, and Fig. 3 a section taken at right angles to Fig. 2 through the blast-pipe.

The bed-plate A of the forge is cast with a central basin and a section, B, of the blast-pipe, which connects with the bellows or other blowing apparatus, and opens into said basin, while the tuyere-crown B with the basin forms the blast-chamber C, and is made convex, with a semi-cylindrical extension or neck, E, which joins the top section, F, of the blast-pipe, whereby the construction of the device is rendered economical, and the tuyere-crown readily replaced when necessary. The tuyere-crown has a curved depression, $a$, around its orifice, and a convex valve, G, carried by a vertical stem, extends partially into this orifice from the basin and regulates the blast through the crown-opening, as may be required, and for cutting it off, when desired, by a lever, $G^1$, which is held in its set position by a pinch-spring, $G^2$.

Piercing the tuyere-crown from the blast-chamber are two or more poke-rods or breakers, $b$ $b$, adapted to be projected above the crown into the bed of fire-coals for loosening and breaking the burning coal, and prevent cinders from hardening and choking the blast-orifice. These poke-rods are independent of the central blast-regulating valve, and are carried by a stem, which, piercing the basin at one side of the central valve-stem, is connected with a lever, H, which, by a spring, I, constantly tends to pull down the poke-rods and maintain their ends even with the upper surface of the tuyere-crown by a stop-shoulder, $c$, on the stem of said rods, resting upon the inner side of the basin, as in Fig. 3, so that in operating the poke-rods by their lever they cannot descend below and become disconnected from the crown which they pierce, and by which they are guided in their thrusts.

The basin has a cinder and an ash discharging bottom opening, which is closed by a valve, d, opening downward, and carried by a weighted lever, J, which tends constantly to close said valve upward against the bottom of the basin. From the valved end of this lever a rake arm or rack, K, rises into the basin independent of the blast-regulating valve, for the purpose of cutting and raking out the cinders and ashes which may fall through the tuyere-orifice into the blast-chamber. In operating this rake-arm the tuyere-valve must be closed, and the blast from the bellows, together with the action of the rake, clears the basin. I prefer to have the rake-arm rigid with the lever, and the range of its movement is sufficient to carry it entirely into and out of the basin.

The poke-stem and the rake are arranged on opposite sides of the tuyere-valve stem, and the levers by which these independent devices are operated are arranged upon the same horizontal fulcrum-stem beneath the bed-plate at the side of the forge-foundation. The basin has a bottom rib projection, e, which forms the guides for the stems of the tuyere-valve and of the poke-rods.

The pinch or gripe spring is a bent strap depending from the bed-plate or side of the forge, and clamps the lever between its folds or sides, while allowing it to be quickly adjusted to regulate the tuyere-valve and to hold it at such adjustment.

The conical form of the valve and the depressed edge of the crown-orifice allow the ashes and cinders to escape from the burning coals and pass down into the blast-chamber, and give the proper diffusion of the air around the valve. The whole interior surface of the crown of the tuyere is exposed to the cooling effects of the blast.

The rake I prefer to have a short flat arm, barbed or toothed on its edges or sides, and to play into and out of the chamber in the arc of a circle coincident with the fulcrum of its lever.

I claim—

1. In a tuyere for blacksmiths' forges, the combination, with the blast-regulating valve G and the bed-crown D, of poke-rods b, adapted to pierce and be projected above said crown independent of said valve, and operated by an independent lever, H, for the purpose stated.

2. The combination, with the poke-rods, adapted to pierce and be projected above the tuyere-crown independent of the blast-valve, and the operating-lever therefor, of a spring, I, adapted to constantly depress said poke-rods and to maintain their ends when not used on a level with the top surface of said crown by a stop, c, substantially as herein set forth.

3. The combination, with a tuyere for blacksmiths' forges, having an ash and cinder discharging valve, d, at the bottom of the blast-chamber, and a blast-regulating valve, G, at its crown, of a rake-arm or rack, K, projecting from said valve d, and adapted to play into and out of said chamber from its bottom independent of the blast-regulating valve, for the purpose stated.

4. The combination, with the operating-lever of the blast-regulating valve of a tuyere, of a pinch or gripe strap spring, $G^2$, between the sides of which said lever is held at its required adjustment, and raised and lowered in the slot between said griping-strap, as described.

5. A tuyere for blacksmiths' forges, consisting of a bed-plate, A, having a removable tuyere-crown, D, a blast-chamber, C, a blast-regulating valve, G, poke-rods b, operating through the crown independent of said valve, an ash and cinder discharging bottom valve, d, a rake-arm or rack, K, projecting therefrom, and a pinch or gripe strap spring, $G^2$, for the blast-regulating valve, and independent levers H $G^1$ J for working the valve, the poke-rods, and the rake, all constructed and arranged substantially as herein set forth.

In testimony whereof I have hereunto set my hand in the presence of two witnesses.

GEORGE M. SMITH.

Witnesses:
WILHEM L. CARPENTER,
THOMAS H. ISEMAN.